Jan. 28, 1969 E. WEICHEL 3,423,921
AGRICULTURAL VEHICLE FOR LOADING, TRANSPORTING
AND UNLOADING OF BULK MATERIALS
Filed Oct. 22, 1965 Sheet 2 of 4
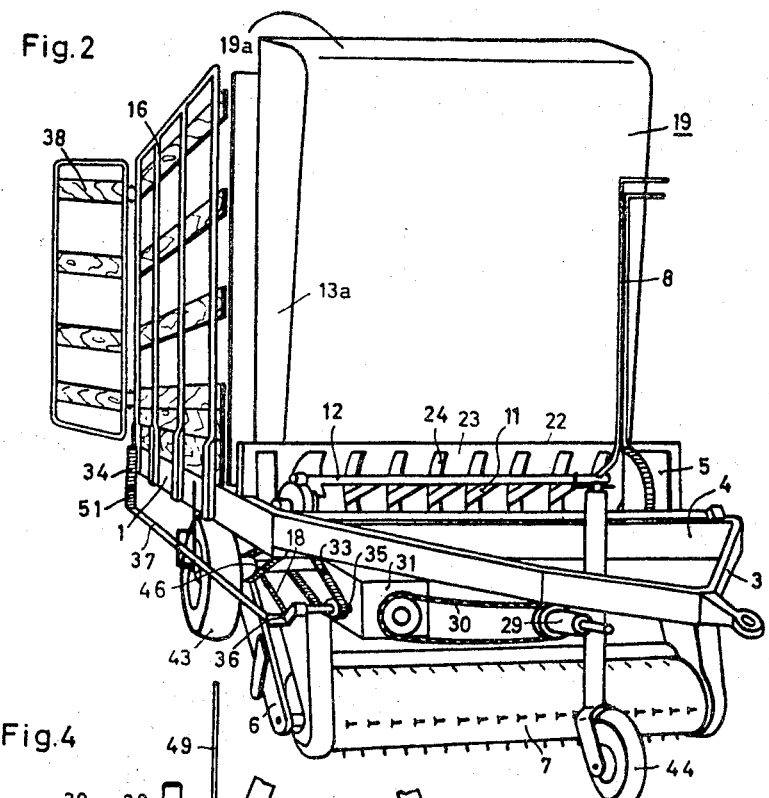
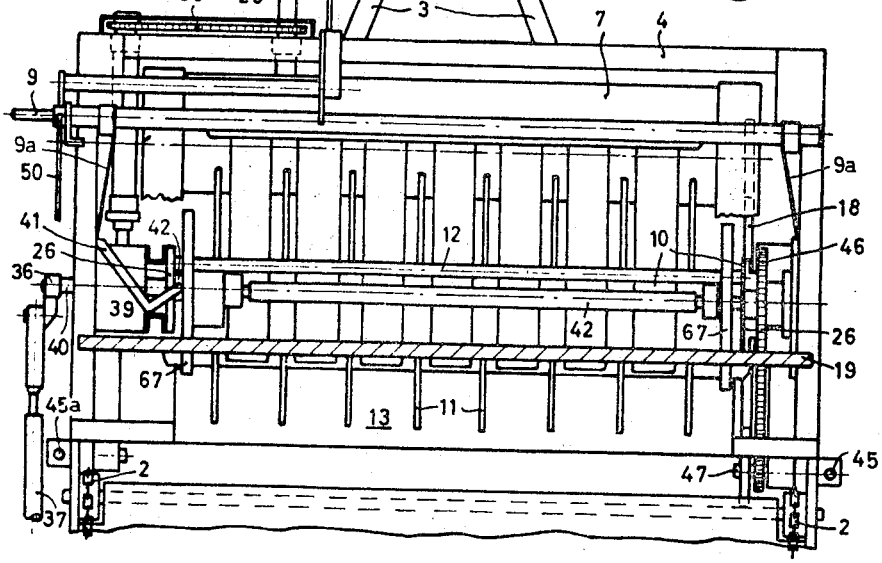
INVENTOR
ERNST WEICHEL
BY Dicke & Craig
ATTORNEYS INVENTOR
ERNST WEICHEL
BY Dicke & Craig
ATTORNEYS

United States Patent Office 3,423,921
Patented Jan. 28, 1969

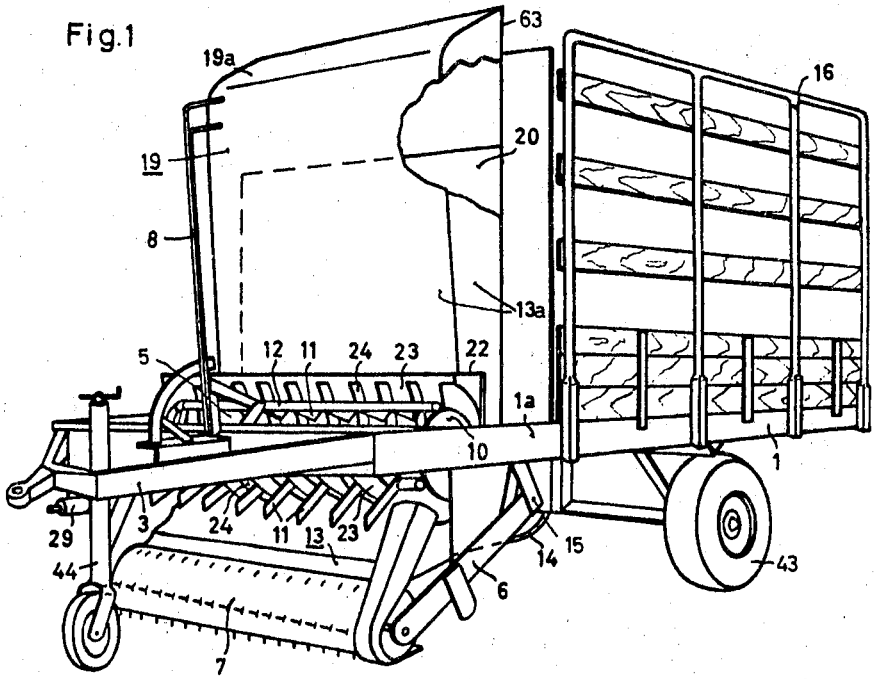
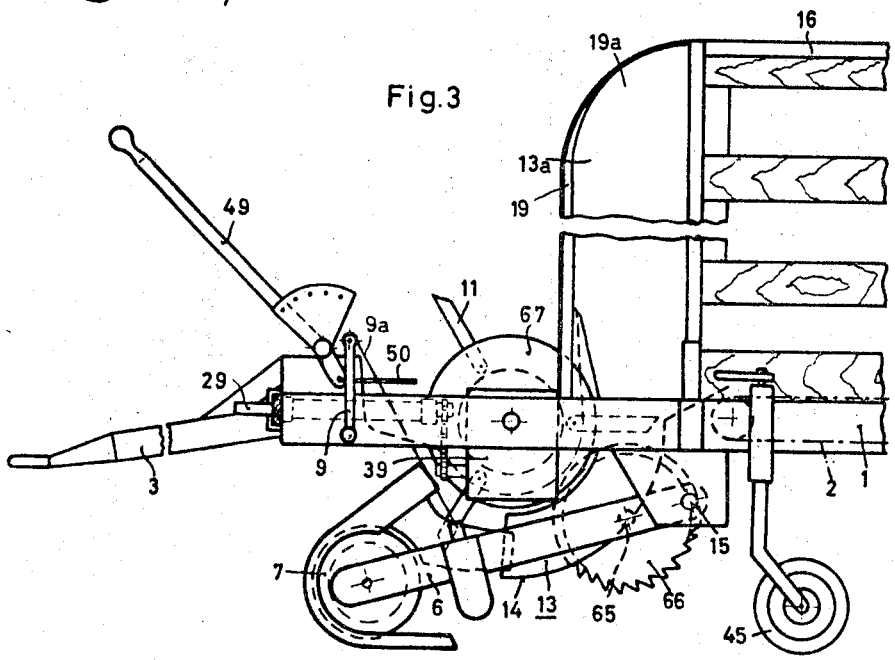

3,423,921
AGRICULTURAL VEHICLE FOR LOADING, TRANSPORTING AND UNLOADING OF BULK MATERIALS
Ernst Weichel, Bahnhofstrasse 1,
7326 Heiningen, Germany
Continuation-in-part of application Ser. No. 115,208, June 6, 1961. This application Oct. 22, 1965, Ser. No. 501,107
U.S. Cl. 56—345    38 Claims
Int. Cl. *A01d 43/02, 87/04*

ABSTRACT OF THE DISCLOSURE

A self-loading vehicle for loading, transporting and unloading bulk agricultural materials, particularly in the form of blades, stalks and the like, including a receiver drum, an adjoining conveyor duct housing conveyor elements for the material to be handled, the outlet opening of the conveyor duct being disposed approximately at the same vertical level as the loading area, and a roller or scraper floor adapted to be driven simultaneously with the receiver drum and the conveyor elements.

---

The present invention which is a continuation in part of my copending application Ser. No. 115, 208 of June 6, 1961, issued on May 24, 1966, as U. S. Patent No. 3,252,277, relates to an agricultural vehicle for the loading, transporting and unloading of bulk agricultural materials, particularly of blades, stalks and similar materials, for example hay, green fodder, straw etc.

A self-loading vehicle for agricultural goods has to fulfill the following requirements of agriculture: high output per hour, low power consumption, short periods for preparation, true one man-operation by the tractor driver, good driving properties, simple unsensitive and economic construction, adaptability to various unloading devices, suitability for green, withered and dry fodder.

Many vehicles are known for the loading of cereal crops, e.g. rear loaders, field chaff-cutters, front loaders, fodder loaders, balers etc. Although the same fulfill one or more of the requirements of agriculture mentioned hereinabove, all these known machines have the disadvantage in common that—owing to their actual principle of operation—they cannot fulfill at least one or more of these important requirements of agriculture at all or can fulfill them only insufficiently.

One object of this invention is to provide an agricultural vehicle for the loading, transporting and unloading of blades, stalks and similar materials which fulfills the above requirements equally well.

Further details of the invention are disclosed in the following description of some embodiments thereof given by way of example with reference to the accompanying drawings, in which:

FIG. 1 is a perspective view of an embodiment of the machine according to the invention as seen from the left;

FIG. 2 is a view of the machine of FIG. 1 as seen at an angle from the front;

FIG. 3 is a partly sectioned side elevation of the pick-up and conveyor mechanism of a somewhat modified embodiment on a larger scale;

FIG. 4 is a plan view of of the embodiment of FIG. 3;

Corresponding components in each embodiment are denoted throughout in the various views by identical reference characters.

Figure 5:
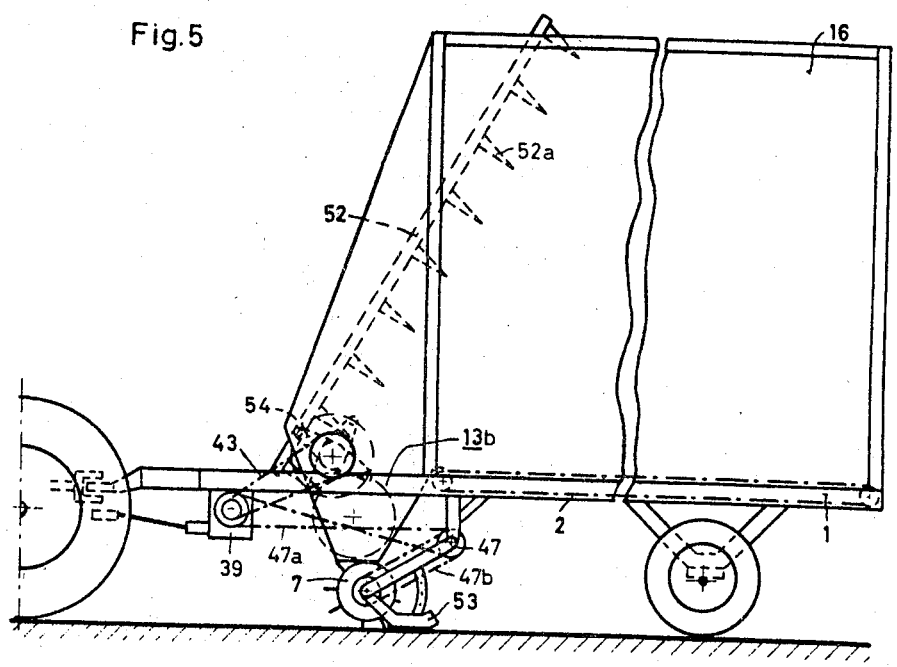
FIG. 5 is a diagrammatic side elevation of another embodiment of the invention.

The main features of the invention are now described in connection with FIGS. 1 to 4, 6 and 7.

Looking first to the common features of the embodiments of FIGS. 1 and 2 as well as of FIGS. 3 and 4, the chassis 1 of a single axle-trailer is extended in front in such a manner that between the extentions 1a, whereon tongue means 3 are secured, the transverse member 4 and a roller or scraper floor 2 on said chassis 1, a recess 5 is formed for the accommodation of a loading device. The same comprises a pick-up drum 7, which is mounted on a cantilever tiltable about pivot 15, and a conveyor drum 10 journalled on the extensions 1a which bear a plurality of pivotally mounted rakes 12 studded with prongs 11, the direction of rotation of which is the opposite of that of the pick-up drum 7. The prongs 11 of the pivotally mounted rakes 12 of the conveyor drum 10 move in and out of a conveyor duct 13, the bottom 14 of which forms substantially a circular arc coaxial with the axis of the conveyor drum 10, and which terminates at its upper end at the level of the floor 2 of the vehicle in the vertical direction.

The superstructure 16 of the vehicle has a front wall 19, the lower part of which is continued at 22 by a grate 23 which has slots 24 matching the prongs 11. The grate 23 which forms a wall of said conveyor duct 13, substantially co-axially surrounds the conveyor drum 10 and is fixed at its lower end to the transverse member 4. Since the prongs 11 protrude only through the slots 24 in the grate 23 into the conveyor duct 13, any coiling of the material conveyed about the conveyor drum 10 is prevented.

A removable vertical transverse wall 20 may be arranged in the superstructure 16 of the vehicle so that such a transverse wall 20 forms the rear wall of a vertical continuation 13a of the conveyor duct 13. The front wall 19 forms in this case the forward wall of the duct continuation 13a. Its upper part 19a runs backward at an arc over the transverse wall 20 which is of lower height. The part 19a and the upper edge of said transverse wall 20 form an opening 63 directed backward into said superstructure. It will be noted that the inlet aperture and the outlet aperture of the conveyor duct 13 are disposed within the contour of the self-loading vehicle, as viewed at right angles to the direction of travel of the vehicle.

The pivotally mounted rakes 12 of the conveyor drum 10 are controlled by means of follow-up rollers and cams in such a manner that they stand perpendicular to the conveyor duct while passing through the same and are withdrawn from the fodder or the duct 13, respectively, in the direction of driving the vehicle, when substantially at the level of the loading area thereof.

Figure 6:
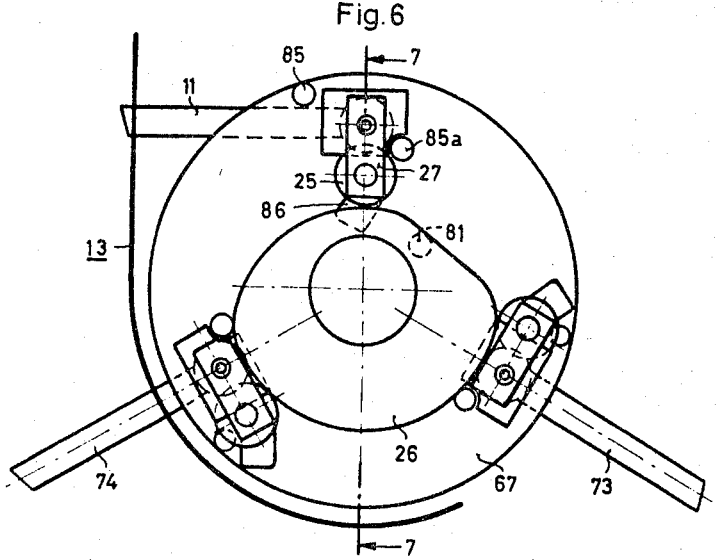
FIG. 6 is a side elevation along line 6—6 of FIG. 7, showing the bearing construction of the conveyor drum and the operating means for prongs carried thereby.
Figure 7:
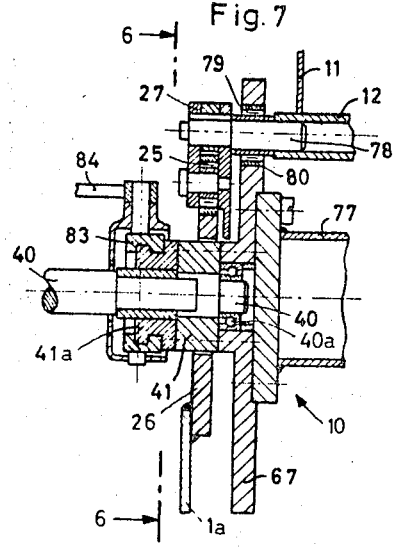
FIG. 7 is a section taken along line 7—7 of FIG. 6.

A suitable mechanism for this purpose is shown in FIGS. 6 and 7. As shown therein, the conveyor drum 10 consists of a sturdy axle 77 which may be made of a tube, at each end (only the driving end shown) of which a disc 67 is fixed for the mountings of the rakes 12 which are constructed as pins 78 with roller bearings 79 in bores 80. The free ends of the pins 78 have lugs 27 with follower rollers 25. The latter contact a cam disc 26, which is fixed on one of the extensions 1a outside the conveyor drum 10. On the driving end of the conveyor drum the same is journalled freely rotatable by means of a bearing 40a on the shaft 40 of a worm gearing 39 (see FIG. 4), and is fixedly connected with one half of a dog clutch 41. On the shaft 40 of the worm gearing the other half 41a of the dog clutch 41 is attached (as by splines) in such a manner that it is restrained from relative rotation but slidable axially by means of a collar 83 engaging into the slidable half 41a and a lever 84. The stationary cam disc 26 is so shaped that the prongs 11 stand substantially radially with respect to the circumference of the conveyor drum between the positions 73 and 74. Then they are tipped about 90°, because the rollers 25 engage the lower part of cam disc 26 so that when leaving the conveyor channel 13 they stand substantially tangential to the circumference of the conveyor drum 10. By the stop 81 mounted on the cam disc 26, which is abutted by an extension 86 of the lug 27 when the prong 11 has been withdrawn from the conveyor channel 13, the prongs are restored to the starting position. The stops 85 and 85a confine the range of tilting of the prongs to approximately 90° even when the follower rollers 25 cannot contact the cam disc 26.

In the embodiment of FIGS. 1 and 2, the conveyor drum 10 is driven by means of a chain 33 from a gear box 31, the drive of the pick-up drum 7 being derived from the conveyor drum 10 by chain 46 and belt 18 in a manner similar to that described below in connection with the embodiment illustrated in FIGS. 3 and 4. The gear box 31 is driven from the tractor by means of its power take-off shaft through the connector shaft 29 and chain drive 30.

The advance of the roller- or scraper-floor 2 is effected by a known step drive 34 (FIG. 2) and pusher pawl 51 combination which is moved in a manner known per se at a variable stroke by means of a pull rod 37 which is articulated to an eccentric 36 keyed to the shaft 35 of the gear box. The advance of the roller- or scraper-floor at each stroke of the pusher pawl is accordingly steplessly controllable. It may be operated together with the pick-up and conveyor-drums or separately.

In the embodiment of FIGS. 1 and 2, the pick-up drum 7 is adjustable in height by means of a lever 8 connected to cantilever 6.

Turning now to the embodiment of FIGS. 3 and 4, the raising of the pick-up drum 7 is effected by a winch operated by the detachable hand crank 9 through pull rope 9a. The drive, leads in this embodiment, from connection shaft 29 and chain 30 to a sturdy worm gearing 39, the worm gear shaft 40 of which can be coupled by means of a dog clutch 41 directly to the through-shaft 42 of the conveyor drum 10 which is of substantially identical construction as that described in connection with the embodiment of FIGS. 1 and 2 (see FIGS. 6 and 7). The eccentric 36 for the pull rod 37 for the step drive of the roller- or scraper-floor 2 is mounted on the left hand side of the vehicle in this embodiment directly at the free end of the worm gear shaft 40. Also in this embodiment the drive mechanism for the scraper floor 2 is of the well-known wheel and ratchet type, wherein the advance of the floor can be adjusted. For this purpose, a hand lever 49 and connecting rod 50 are provided.

In this embodiment the pick-up drum 7 is driven from the intermediate shaft 47 through a belt 18, and this intermediate shaft is driven by a chain drive 46 from the conveyor drum 10. Since the intermediate shaft 47 is coaxial with the point of articulation 15 of the cantilever 6, the tension of the belt is not affected by the raising or lowering of the pick-up drum 7. The conveyor channel 13 ends substantially at the level of the loading area. The front wall 19 forms accordingly the front wall of the superstructure 16 of the vehicle.

The vehicle has two main wheels 43. An adjustable supporting wheel 44 (FIGS. 1 and 2) or two supporting wheels 45 (FIG. 3) mounted on the vehicle may serve for the support of the vehicle when parked.

Manner of operation: a towing device such as a tractor pulls the attached loading and transporting machine over the goods to be loaded while the goods are generally lying on the field in swaths, which goods are engaged by the pick-up drum 7 and are conveyed into the conveyor duct 13. There they are taken over by the prongs 11 of the conveyor drum 10 and are brought in the conveyor duct 13 substantially to the level of the loading area, where the conveyor prongs 11 are withdrawn from the conveyor duct 13. The further transport upward i.e. up to the height of the superstructure 16 of the vehicle takes place by the pushing action of the subsequent goods which are thereby compressed in the loading space. The material which emerges from the duct at the level of the floor 2 will lie constantly over the discharge end of the duct so that the subsequently arriving material which is being conveyed by prongs 11 is forced to emerge against the pressure of the material already present at the top of the duct and to lift this material. If the transverse wall 20 is removed, the subsequently arriving material will be compressed quite strongly due to the weight of the quantity of material lying over the duct opening and partly hanging together with the material already lying on the scraper floor. Subsequently the material conveyed is forced onto the roller- or scraper-floor which, depending on the compression and height of loading desired, transports the same either continuously or at certain time intervals in the direction towards the rear end of the loading area, until it is dammed up at the rear wall 38 of the superstructure 16. When the roller- or scraper-floor remains in operation subsequently, it must run under the goods conveyed so that further compression is effected. By the correct adjustment of the speed of advance of the roller- or scraper-floor any desired compression and height of loading may be attained even at a varying speed of driving the vehicle or a varying quantity of goods being transported per metre of driving distance covered.

If the rear wall 20 is present, the goods are forced upward in duct continuation 13a until they fall from opening 63 onto the roller- or scraper-floor 2. By the free fall, the compressing action in continuation 13a is nullified to a great extent. The goods come onto the roller- or scraper-floor more or less loosely.

After the filling of the loading space the pick-up drum 7 is raised by means of the hand lever 8 or 9, respectively, and the vehicle is driven to the unloading place without any further readjustment. There the hinged rear wall 38 of the loading space 16 is opened, and the goods are unloaded in a few minutes by operating the roller- or scraper-floor. The vehicle is ready for renewed use in approximately the same time as required for attaching any other trailer to the tractor. Accordingly as a rule the use of the so-called interchange trailers may be dispensed with. The goods after they are unloaded are conveyed to the storage place by a second person using any type of unloading appliance in the time interval until the next load arrives.

In the embodiment of FIG. 3 moreover an additional appliance for the comminuting of the goods conveyed is illustrated which may be of advantage when loading cumbersome materials. On the bottom 14 of the conveyor duct 13 a shaft 65 is arranged on which a plurality of cutter discs or saw blades 66 (only one being shown) is mounted, which protrude into the conveyor duct through slots and are interspersed with the conveyor prongs 11. The shaft 65 turns at a suitable rotational speed, so that the goods conveyed while passing through the conveyor duct are comminuted to the size of the spacing of the discs 66 from one another. This cutting device requires little power.

FIG. 5 shows in side elevation a further embodiment of a loading machine, in which as the conveyor members conventional push rods 52 are used, which are studded with teeth 52a, while the pick-up drum is kept at a constant distance from the soil by a slider shoe 53. Its drive is from the gear box 39 to the intermediate shaft 47 by a crossed belt 47a and therefrom by a belt or chain 47b. The drive of the push rods 52 is effected through a chain 43 and crank shaft 54 turning counterclockwise, as viewed, so that the loading can be carried out through a funnel-shaped conveyor duct 13b into the open frontal face of the superstructure 16 of the vehicle.

Figure 8:
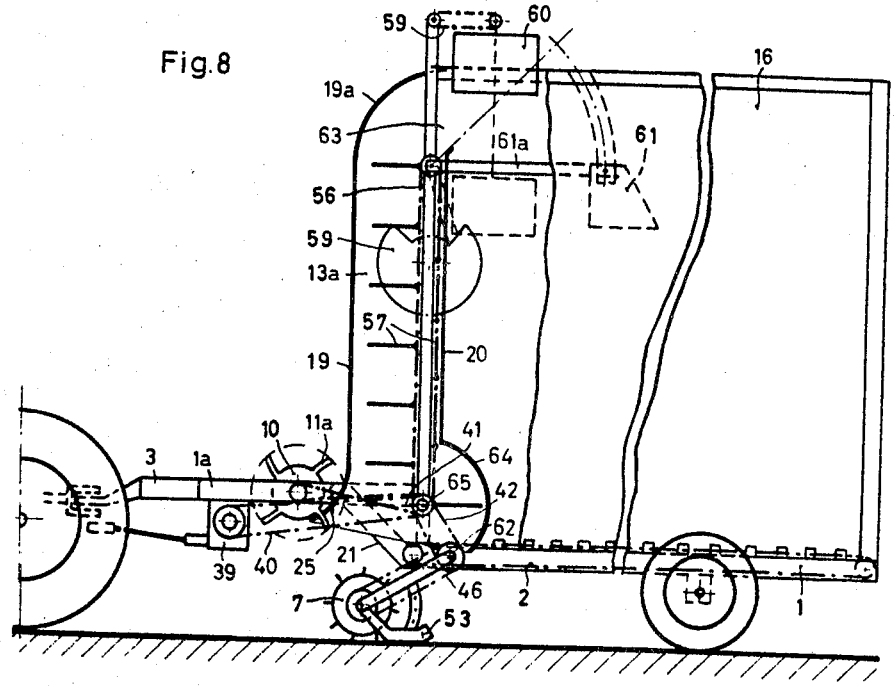
FIG. 8 is a diagrammatic side elevation of a further embodiment of the invention.

FIG. 8 shows a further embodiment of the invention. The lateral beams of the frame 1 are upwardly offset and continued not in a straight line but through bends 21 for forming a deep-loader, so that between the extensions 1a, a (not shown) traverse carrying the draw means 3, and the loading area a recess is formed again for the accommodation of the loading and transporting device. The same is supported on the soil by, e.g., a slider shoe 53 or by supporting wheels. It can be raised into the running position in the manner shown with respect to the first exemplary embodiment.

The conveyor drum 10 mounted on the frame opposite the pick-up drum 7 and rotating in a direction opposite that of the drum 7 is provided in this exemplary embodiment with securely mounted conveyor elements 11a which are curved opposite the direction of their rotation. They protrude through slots in the arcuated grate 25 which downwardly continues the end wall 19 of the vertically upwardly extending conveyor duct 13a. Thanks to the grate curvature disposed eccentrically to the conveyor drum, the conveyor elements immerse in the goods to be conveyed only during a part of their rotation and they are automatically separated from the conveyed goods when they leave the slots of the grate.

In the conveyor duct 13a of the represented exemplary embodiment rotates a conveyor chain 56 having prongs 57. In this case the drive is effected by a worm gearing 39 coupled to the power take-off shaft of the tractor and directly driving the drive shaft 65 of chain 56 through a belt or chain 40, wherefrom the drives of the pick-up drum 7 and the conveyor drum 10 are derived so that the conveyor drum 10 is driven through a crossed belt 41, while the pick-up drum 7 is driven by belts or chains 43 and 46 over an intermediate wheel 62 mounted at the pivot point of the pick-up drum. Thus, the conveyor drum 10 rotates in a direction opposite the direction of rotation of the pickup drum 7, while the path of movement of the conveyor prongs extends partly ahead of the path of movement of the prongs of the pick-up drum. Thus, the prongs of both the conveyor drum and pick-up drum engage the goods in the manner of tongs and conjointly draw the goods into the conveyor duct 13a, whereupon the goods in the conveyor duct 13a are pushed by the prongs 57 upwards until the goods are deflected rearwards by the arcuated upper part 19a of the front wall 19 and fall from the passage opening 63 onto the roller- or scraper-floor 2.

The conveyor chain 56 is preferably provided with tiltable prongs 57 to thereby save space for the return channel for the chain. Thus, the rear wall 20 of the conveyor duct is identical to the end wall of the loading space just as in the first exemplary embodiment. The same has an arcuated bulge 63 within the range of the lower reversing shaft 65 for the conveyor chain, where the conveyor prongs 57 can erect themselves before entering the conveyor duct 13a.

At the exit 63 of the conveyor duct there can be provided also a presser appliance, for which two exemplary embodiments are shown by broken lines in FIGURE 8 and which may consist of a weight 60 moved up and down continually or as required by means of a cable winch 58. Instead of this weight it is possible to use a presser 61 mounted on a pivot arm 61a and actuated by a rotating control cam 59 so that even the uppermost layers of the load can be compressed.

What is claimed is:

1. An agricultural vehicle for loading, transporting and unloading of blades, stalks and similar materials comprising a chassis frame having rigid extensions at its front end, a gathering tank having sidewalls and a door at one end, transporting means on the bottom of said tank, a vertically-adjustable pick-up device and a conveyor equipment at the other end of said gathering tank, said conveyor equipment consisting of a duct defined by at least two opposed walls, one of said walls having a movable section adjoining said pick-up device, and a fixed section leading to said gathering tank, and of driven translating means pivotable about at least one axis, journalled in said extensions at a distance above said pick-up device and said movable section and engaging into said duct.

2. An agricultural vehicle according to claim 1, wherein one of the walls of said duct is an extension of the front wall of said gathering tank.

3. A pick-up and conveying device for the loading, under pressure, of agricultural material in the form of blades, leafy stalks and the like, constructed in the form of an attachment for a self-loading vehicle having a chassis frame and a gathering tank, comprising:
  a driven pick-up drum adapted to conform itself to the level of the ground,
  a conveyor duct defined by at least two opposed end walls, one of said walls having at least one movable section adjoining said pick-up drum and a fixed section leading to one end of said gathering tank,
  and driven conveying elements adapted for operation within said conveyor duct and rotating about at least one axis journalled within rigid extensions of said vehicle frame outside of said conveyor duct at a distance above said pick-up drum and said movable section of said end wall, the orbit of the extreme ends of said conveying means, at least at specific points thereon, being spaced relatively close to said fixed section of said conveyor duct and extending out of the material being conveyed through said conveyor duct at the end of the upwardly directed effective conveying portion of said orbit, laterally of the conveying direction.

4. A device according to claim 3, wherein said pick-up drum defines the lower limit of a duct inlet aperture oriented substantially toward the front of said duct.

5. A device according to claim 4, wherein said inlet aperture and said outlet aperture of said conveyor duct are disposed within the contour of the self-loading vehicle, as viewed at right angles to the travel direction of the vehicle.

6. A device according to claim 4, wherein said movable wall section is provided with side walls and a rear edge, all of which extend, at each level of said pick-up drum, beyond the front edge of the fixed wall section and between the fixed side walls thereof.

7. A device according to claim 6, further comprising a vertically-adjustable sliding shoe secured to said pick-up drum, said shoe guiding said drum, in the operating position, at a constant predetermined distance from the ground.

8. A device according to claim 4, wherein said pick-up drum is secured to support arms, said support arms being hingedly-connected to brackets mounted upon said frame.

9. A device according to claim 8, wherein the point of hinged connection of said support arms at said brackets is disposed concentrically with an intermediate shaft, said intermediate shaft supporting thereon a drive wheel for driving said pick-up drum.

10. A device according to claim 3, wherein said movable duct section adjoining said pick-up drum is adapted to be vertically-adjusted simultaneously, at least in part, with said pick-up drum.

11. A device according to claim 3, wherein said extensions are connected by a transverse beam carrying drive elements and operating units of the pick-up and conveying device, and a drawgear of the self-loading vehicle.

12. A device according to claim 11, wherein said extensions are attached to the side struts of the frame of the vehicle.

13. A device according to claim 11, wherein said extensions, as well as said transverse beam, are detachably secured to the vehicle frame.

14. A device according to claim 11, further comprising a winch having a crank handle control therefor for lifting said pick-up drum from its mounting, said winch being secured to said transverse beam.

15. A device according to claim 11, wherein said transverse beam is provided with a connecting pin thereon, in the region of the center of the vehicle, said pin adapted for receiving a drive shaft of the vehicle, said pin being in driving connection, by means of a transmission gear, with a gear disposed laterally at the vehicle frame.

16. A device according to claim 11, wherein one of the walls of said conveyor duct is constructed in the form of a slotted screen, the front edge of said screen being secured to said transverse beam and being guided substantially concentrically about a conveyor drum provided with conveying teeth, and passing into the front wall of the gathering tank.

17. A device according to claim 16, wherein said teeth of said conveyor drum engage into said conveyor duct through slots in said screen and rotate in a direction opposite to the direction of rotation of said pick-up drum.

18. A device according to claim 16, wherein said conveying teeth extending through slots in said screen are of strong construction and have a length corresponding approximately to the inside diameter of said conveyor duct.

19. A device according to claim 16, wherein said teeth of said conveyor drum are rigid and are curved in a direction opposite to the direction of movement thereof.

20. A device according to claim 16, wherein several rows of conveying teeth are provided on pivotable rakes mounted in two disks of the conveyor drum.

21. A device according to claim 20, wherein said disks are connected with an axial tube extending therethrough.

22. A device according to claim 3, wherein that portion of the orbit of the conveying elements positioned within the conveyor duct extends to approximately the level of the loading surface of said gathering tank.

23. A device according to claim 3, wherein the axis of rotation of the conveying elements is disposed substantially parallel to the axis of rotation of said pick-up drum.

24. A device according to claim 3, wherein at least one rotating shaft of said pick-up and conveying device is provided with an eccentric for the connection of a push-rod.

25. A device according to claim 3, wherein said frame extensions are offset, at the bottom thereof, in a direction obliquely rearward.

26. A device according to claim 3, wherein the orbit of said conveying means in said conveyor duct extends predominately upwardly and, outside of said conveyor duct, extends predominately in a downward direction.

27. A device according to claim 3, wherein the rigid portion of the boundary wall terminates approximately at a height equal to that of the vehicle frame.

28. A device according to claim 27, wherein said screen extends, in the region in which it is guided about the conveyor drum, concentrically with the axis of the conveying drum and at a substantial distance from the opposite wall of said conveyor duct.

29. A device according to claim 3, wherein said frame extensions, as mounted to said vehicle, define, together with a cross connection and the end of the floor of said gathering tank, a rectangular recess.

30. A device according to claim 3, wherein the rotating axis of said conveying means includes a crankshaft with push-rods hingedly connected thereto.

31. A device according to claim 30, wherein said push-rods are arranged in an offset manner with respect to one another, said crankshaft thus effecting the removal of said conveying means from said conveyor duct.

32. A device according to claim 3, further comprising a worm gear secured on one side of said vehicle frame, a shaft for said worm gear, mounted in alignment with the axle of said conveying means and connected for rotation therewith by means of a coupling, an eccentric disposed on the opposite end of said shaft, a tie rod coupled with said eccentric, and a stepping gear connected with said tie rod.

33. A device according to claim 3, wherein several rows of conveying means engage alternately into said conveyor duct.

34. A device according to claim 3, wherein the path of travel of the material to be conveyed, between the duct inlet aperture and said gathering tank, includes no more than one change in the upward direction.

35. A device according to claim 3, wherein the outlet aperture of said conveyor duct is oriented obliquely upwardly.

36. A device according to claim 3, wherein the boundary of the outlet aperture of said conveyor duct is disposed in a vertical plane such that the exit direction of the material to be conveyed extends oppositely to the travel direction.

37. A device according to claim 3, where in said conveyor duct extends, in the region between the inlet aperture and the outlet aperture thereof, exclusively in an ascending direction.

38. A device according to claim 3, wherein said conveying means enter said duct through the inlet aperture for the material and are pulled therefrom through slots in a boundary wall of said duct.

References Cited

UNITED STATES PATENTS 2,729,047   1/1956   Cheatum     56—344
3,252,277   5/1966   Weichel     56—345

ANTONIO F. GUIDA, *Primary Examiner.*

U.S. Cl. X.R.

56—364